US009977798B2

(12) United States Patent
Bester et al.

(10) Patent No.: US 9,977,798 B2
(45) Date of Patent: May 22, 2018

(54) DATA MIGRATION AND TABLE MANIPULATION IN A DATABASE MANAGEMENT SYSTEM

(71) Applicant: International Business Machines Corporation, Armonk, NY (US)

(72) Inventors: Karla Bester, Ridgewood (AU); Allan T. Chandler, Floreat (AU); Mark A. Shewell, Perth (AU); Stephen J. Yates, Beaconsfield (AU)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 14/803,230

(22) Filed: Jul. 20, 2015

(65) Prior Publication Data

US 2017/0024382 A1    Jan. 26, 2017

(51) Int. Cl.
G06F 17/30    (2006.01)

(52) U.S. Cl.
CPC ...... *G06F 17/303* (2013.01); *G06F 17/30339* (2013.01)

(58) Field of Classification Search
CPC .................................................... G06F 17/303
See application file for complete search history.

(56) References Cited

U.S. PATENT DOCUMENTS

| 5,548,758 | A | 8/1996 | Pirahesh et al. |
| 5,717,924 | A | 2/1998 | Kawai |
| 5,819,254 | A | 10/1998 | Kawai |
| 7,236,991 | B2 | 6/2007 | Becker et al. |
| 8,782,101 | B1 | 7/2014 | Moore |
| 2006/0136443 | A1 | 6/2006 | Dulay et al. |
| 2007/0079140 | A1 | 4/2007 | Metzger et al. |
| 2008/0228550 | A1 | 9/2008 | Tan et al. |
| 2009/0327208 | A1 | 12/2009 | Bittner et al. |
| 2012/0265726 | A1* | 10/2012 | Padmanabhan ....... G06F 17/303 707/602 |
| 2013/0173546 | A1 | 7/2013 | Cline et al. |
| 2014/0279914 | A1 | 9/2014 | Bester et al. |

OTHER PUBLICATIONS

DBConvert. Common Features and Requirements. Jun. 25, 2014. <web.archive.org/web/20140625081515/http://dbconvert.com/common-features.php>.*
Larsen, Gregory A.; "Transferring Data from One Table to Another"; Database Journal, An IT Business Edge Site; May 31, 2005; pp. 1-9; <http://www.databasejournal.com/features/mssql/article.php/3507171/Transferring-Data-from-One-Table-to-Another.htm>.
"SQL Plus User's Guide and Reference"; Release 9.0.1; Jul. 2001; Part No. A88827-02; pp. 1-432.
"Appendix P: List of IBM Patents or Patent Applications Treated as Related", Jul. 20, 2015.

* cited by examiner

*Primary Examiner* — Syed H Hasan
(74) *Attorney, Agent, or Firm* — Walter L. Rudberg; A. Imtiaz Billah (57) ABSTRACT

A method for migrating data between tables. The method includes, receiving a Structured Query Language (SQL) statement, where the SQL statement identifies a source table and a destination table, and the source table contains source data divided into columns with a set of column names. A database management system identifies a set of instructions for manipulating the source data. The database management system generates an interim SQL statement, based on the SQL statement. The database management system executes the interim SQL statement, which copies the manipulated source data into a set of columns of the destination table.

20 Claims, 5 Drawing Sheets

FIG. 1A

```
MIGRATE -> [source] -> TO -> [destination] -+-----------------------*
                              |       ^ |
                              |       | |
                              *-> [where-clause] -*  |
                                        |

*----------------------------------------------------------*
|
*-+------------------+------------------------------------------------------------//
  |      ^ |         ^ |           ^ |           ^
  |      | |         | |           | |           |
  *-> [set-clause] -*  *-> [drop-clause] -*  *-> [skip-clause] --*  *-> [error-clause] -*
``` where-clause:
     standard where clause syntax set-clause:
```
    SET ---> [column-name] -> TO -> [formula] -+-//
       ^                                       |
       |                                       |
       *----------------- , <-----------------*
``` drop-clause:
```
    DROP ---> [column-name] -+-//
        ^                    |
        |                    |
        *-------- , <------*
``` skip-clause:
```
    SKIP ---> [column-name] -+-//
         ^                   |
         |                   |
         *-------- , <------*
``` error-clause:
```
    ON ERROR -+-------------[error handling]---------------//
             ^                              |
             |                              |
             *------------------------ , <-----------------*
```

| OldEmployees | | | | | |
|---|---|---|---|---|---|
| 211A | 212A | 213A | 215A | 216A | 217A |
| StartData | FirstName | LastName | Salary | SocialSecurityNumber | NickName |
| 2001-01-01 | JOHN | SMITH | 50000 | 001-234-9876 | JOHNNIE |
| 2010-01-01 | ANDREW | BLACK | 60000 | 023-433-8224 | ANDY |
| 2010-01-01 | ANN | WHITE | 98000 | 186-911-2222 | ANNIE |
| 2010-01-01 | JACK | BROWN | 33000 | 002-862-1198 | JACKO |
| 2010-01-02 | LESLIE | SUMMERS | 112000 | 098-295-1971 | LES |
| 2010-12-31 | FRANK | PALMER | 74000 | 000-195-0998 | FRANKIE |
| 2010-12-31 | OLIVE | GREEN | 150000 | 002-000-0001 | OLLIE |

| NewEmployees | | | | | |
|---|---|---|---|---|---|
| 211B | 212B | 213B | 215B | 216B | 217B |
| StartData | FirstName | LastName | Salary | SocialSecurityNumber | NickName |
| - | - | - | - | - | - |

| NewEmployees | | | | |
|---|---|---|---|---|
| 211C | 214C | 215C | 216C | 217C |
| StartData | FullName | Salary | SocialSecurityNumber | NickName |
| 2010-01-01 | ANDREW BLACK | 63000.0 | 000-000-0000 | - |
| 2010-01-01 | ANN WHITE | 102900.0 | 000-000-0000 | - |
| 2010-01-01 | JACK BROWN | 34650.0 | 000-000-0000 | - |
| 2010-01-02 | LESLIE SUMMERS | 117600.0 | 000-000-0000 | - |
| 2010-12-31 | FRANK PALMER | 77700.0 | 000-000-0000 | - |
| 2010-12-31 | OLIVE GREEN | 157500.0 | 000-000-0000 | - |

FIG. 4 ously, in accordance with an embodiment of the present invention.

DATA MIGRATION AND TABLE MANIPULATION IN A DATABASE MANAGEMENT SYSTEM

BACKGROUND OF THE INVENTION

The present invention relates generally to the field of database systems and, in particular, an approach that provides a flexible tool for migrating data from one table in a relational database to another.

A database is an organized collection of information, commonly referred to as data. Data contained within a database is often maintained within tables. Access to a database is provided by a database management system (DBMS). A DBMS is an application which allows the storage of data within a database, the modification of that data within the database, as well as the extraction of the data from the database.

DBMS's can differ widely in the way information is stored, effecting how quickly and flexibly the DBMS can access data. One type of a DBMS is a relational database management system wherein data is stored in the form of related tables. Specifically, a relational DBMS usually contains multiple databases, with each database containing one or more tables and each table containing one or more columns.

SUMMARY

A method for migrating data between tables, the method comprising: receiving, by one or more processors, a Structured Query Language (SQL) statement, wherein the SQL statement identifies a source table and a destination table, and wherein the source table comprises a plurality of source data divided into columns with a set of source column names; identifying at least one set of instructions associated with the SQL statement, wherein the at least one set of instructions further comprise: instructions for manipulating the plurality of source data; generating an interim SQL statement, based on the SQL statement; and executing the interim SQL statement, wherein executing the interim SQL statement comprises: copying the manipulated plurality of source data into a set of destination columns of the destination table.

Another embodiment of the present invention provides a computer program product for migrating data between tables, based on the method described above.

Another embodiment of the present invention provides a computer system for migrating data between tables, based on the method described above.

DETAILED DESCRIPTION

Migration of data from one table to another involves copying the data and moving it to a new location. There are many situations where data is to be copied from one table to another. In many of these situations, when copying data from an original source table to a separate destination table, the destination table firstly needs to be created or modified from its existing structure, in order to accommodate the data transfer.

The systems and methods described herein can be used to facilitate a simplified table migration. The simplified migration can be achieved by automatically creating or manipulating a destination table to facilitate a requested table structure, as well as copying the data from the source table to the new destination table. The table migration as described herein, can provide an efficient, fast, and error reduced data migration. Language extensions are provided to permit a simplified mass data transfer between database tables, while at the same time providing flexibility in terms of manipulating the destination table structure during the transfer.

Databases store and track large amounts of information in an organized manner. Databases are managed by a database management system. A relational database management system is a type of a database management system that manages the information contained within a database and how a user accesses the information on a relational basis. A relational database management system utilizes relational operators to manipulate the data in tabular form.

A relational database management system may operate on information handling systems capable of preforming various computing operations. The information handling systems can be operated in a wide variety of computing systems which may operate in a networked environment.

Figure 1A:
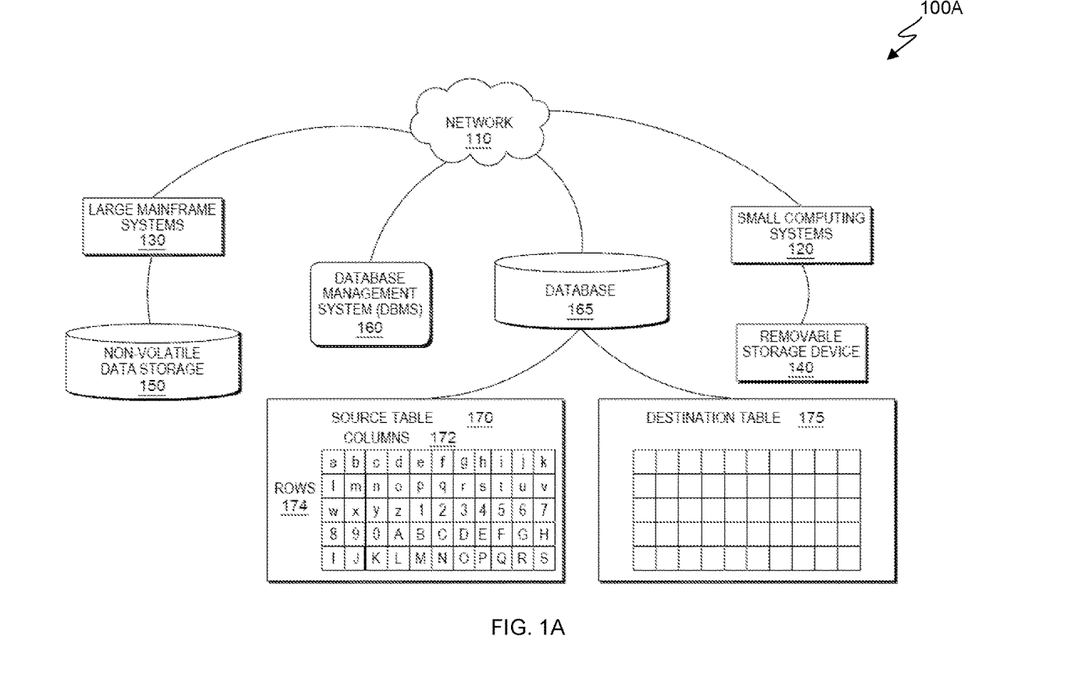
FIGS. 1A and 1B illustrate an exemplary environment of various information handling systems and a syntax, respectively, in accordance with an embodiment of the present invention.

FIG. 1A illustrates exemplary environment 100A wherein various information handling systems may operate, in accordance with an embodiment of the present invention. Exemplary environment 100A contains network 110, and various information handling systems such as small computing systems 120 and large mainframe systems 130, as well as database 165, which includes source table 170 and destination table 175, and database management system (DBMS) 160.

As shown in FIG. 1A, the various information handling systems may be networked together using network 110. Examples of network 110 that may be used to interconnect the various information handling systems include, but are not limited to, Local Area Networks (LANs), Wireless Local Area Networks (WLANs), the Internet, the Public Switched Telephone Network (PSTN), as well as other wireless networks. Network 110 may include a cable, a router, switches and/or a firewall. Network 110 may include wired, wireless or fiber optic connections.

Types of information handling systems that can access a relational DBMS range from small computing systems 120 to large mainframe systems 130. Examples of small computing systems 120 include, but are not limited to, cellular phones, smart phones, mobile phones, laptop computers, tablet computers, personal computers, personal organizers, e-reading devices, gaming devices, workstations, servers, and the like. It should be noted that small computing systems 120 and large mainframe system 130 are exemplary and therefore may contain any number of small computing systems 120 and/or large mainframe systems 130.

The information handling systems (small computing systems 120 and large mainframe systems 130) of FIG. 1A may include non-volatile data storage, such as hard drives and/or non-volatile memory. For exemplary purposes, the information handling system, such as large mainframe systems 130 contains a separate non-volatile data storage 150. The non-volatile data storage can be a component that is external to the various information handling systems or it can be internal to one of the information handling systems. In addition, removable storage device 140 can be shared among two or more information handling systems using various techniques, such as connecting the removable storage device 140 to a USB port or other connector of the information handling systems.

In the exemplary embodiment, database management system 160 manages database 165. DBMS 160 is capable of communication and data exchange over network 110. Alternatively, DBMS 160 may be interconnected directly without the use of network 110, with an information handling system, for example small computing systems 120 or large mainframe systems 130. Information handling systems (for example, small computing systems 120 and large mainframe systems 130) are capable of performing computing operations as required by a relational database management system 160.

DBMS 160 enables storage, modification, deletion, and extraction of information within a database. In the exemplary embodiment, DBMS 160 serves as the interface between database 165 and the end user or other applications. Additionally, there are many types of DBMS, such as the relational database management system. A relational database management system utilizes relational operators to manipulate the data in tabular form. Relational database management systems provide Structured Query Language (SQL) to enable data manipulation within the database. SQL is a special-purpose programming language designed for managing data held in a relational database management system.

In the exemplary embodiment, database 165 is capable of communication and data exchange over network 110. Alternatively, database 165 may be interconnected directly without the use of network 110, with an information handling system, for example small computing systems 120 or large mainframe systems 130, and/or with DBMS 160. Database 165 is a set of organized related data. Access to the data is through DBMS 160. Database 165 may include non-volatile data storage, such as hard drives and/or non-volatile memory. A common database structure is the relational database format which uses a table based structure. Typically a database may contain multiple tables, but for exemplary purposes, database 165 contains only two tables, source table 170 and destination table 175.

Source table 170 and destination table 175 may be co-located on database 165. Alternatively, source table 170 and destination table 175 may be located on separate databases connected over network 110 (not shown). In another embodiment, destination table 175 may not exist until the commencement of the data transfer. Source table 170 portrays various characters representing data. The data within source table 170 may be migrated to destination table 175. Generally, tables are uniquely identified by their names and are comprised of columns and rows. Typically a table may contain one or more columns and associated rows of data. Source table 170 contains several columns 172 and rows 174.

There are many situations where data needs to be copied from one table to another within the same database or between databases. These situations include, but are not limited to, data migration, dispersal of data, and creation of test and development environments. Data migration may cause changes to the table layout and/or content when software is updated with new functionality or problem fixes. Dispersal of data is the separating of a single large table into two or more tables, such as into geographical regions. Additionally, data could be copied with the creation of test and development environments, mirrored from the production environment, or with the duplication of those environments for parallel development or testing purposes. In many of these situations, the data being transferred is substantial, but with relatively small changes to the data or table structure, such as the changing of column data types, or the protection of sensitive data when transferring data from production to development and test environments.

Copying data from one table to another within the same database, or between databases, generally entails a two-step process. First, a destination table is established, and then the data can be copied from the source table to the destination table. The source table is the source from which the data is originating, and the destination table is the location to which the data is being copied. Generally, in preparation of the data transfer, in order to copy data from one table to another, the destination table is either created or altered to match the required destination table structure before the data can be copied.

The exemplary embodiment provides a way of mass data migration which copies data from a source table to a destination table, as well as creates or manipulates the destination table to the structure required for the data transfer. Additionally, the exemplary embodiment provides language extensions to permit greatly simplified specification of mass data transfer between tables, while at the same time providing flexibility in terms of manipulating the destination table structure during the transfer. The exemplary embodiment includes abilities such as: (a) creating or manipulating the destination table structure to enable the data transfer; (b) copying data from all matching column names from the source table to the destination table; (c) manipulation of the data during the data transfer, and (d) error handling.

Specifically, in this exemplary embodiment, a simplified method to copy data from one table to another, transferring by default all columns in the source table to the same name columns in the destination table, while at the same time creating the destination table (if it does not exist), or manipulating the destination table structure to the appropriate structure to facilitate the data transfer is provided.

The following example and diagrams of a migration statement syntax portray some capabilities of the exemplary embodiment and its implementation. The MIGRATE clause may be parsed into its components based on the syntax of the statement. Specifically, the MIGRATE statement may include an optional WHERE clause; an optional SET clause; an optional DROP clause; an optional SKIP clause; an optional ON ERROR clause, and similar syntax known in the art.

For example, the data transfer process described in the preferred embodiment may include functions such as: (a) automatically create the destination table, based on the determined schema, if the destination table does not exist already; (b) automatically adjust the destination table structure to enable the data transfer, where the existing destination table structure does not facilitate the data transfer; (c)

copy, by default, data from all matching column names from the source table to the destination table; (d) exclude the contents of specific source columns from the data transfer ("SKIP" below); (e) drop the destination table columns ("DROP" below); (f) specify a selection clause to copy only specific rows from the source table to the destination table ("WHERE" below); (g) set destination columns to a formula ("SET" below); (h) automatically convert data from the source table column data type to the destination table column data type, where possible; and (i) error handling specification, for example specifying what to do when a column referenced in a DROP clause does not exist in the destination table.

Figure 1B:
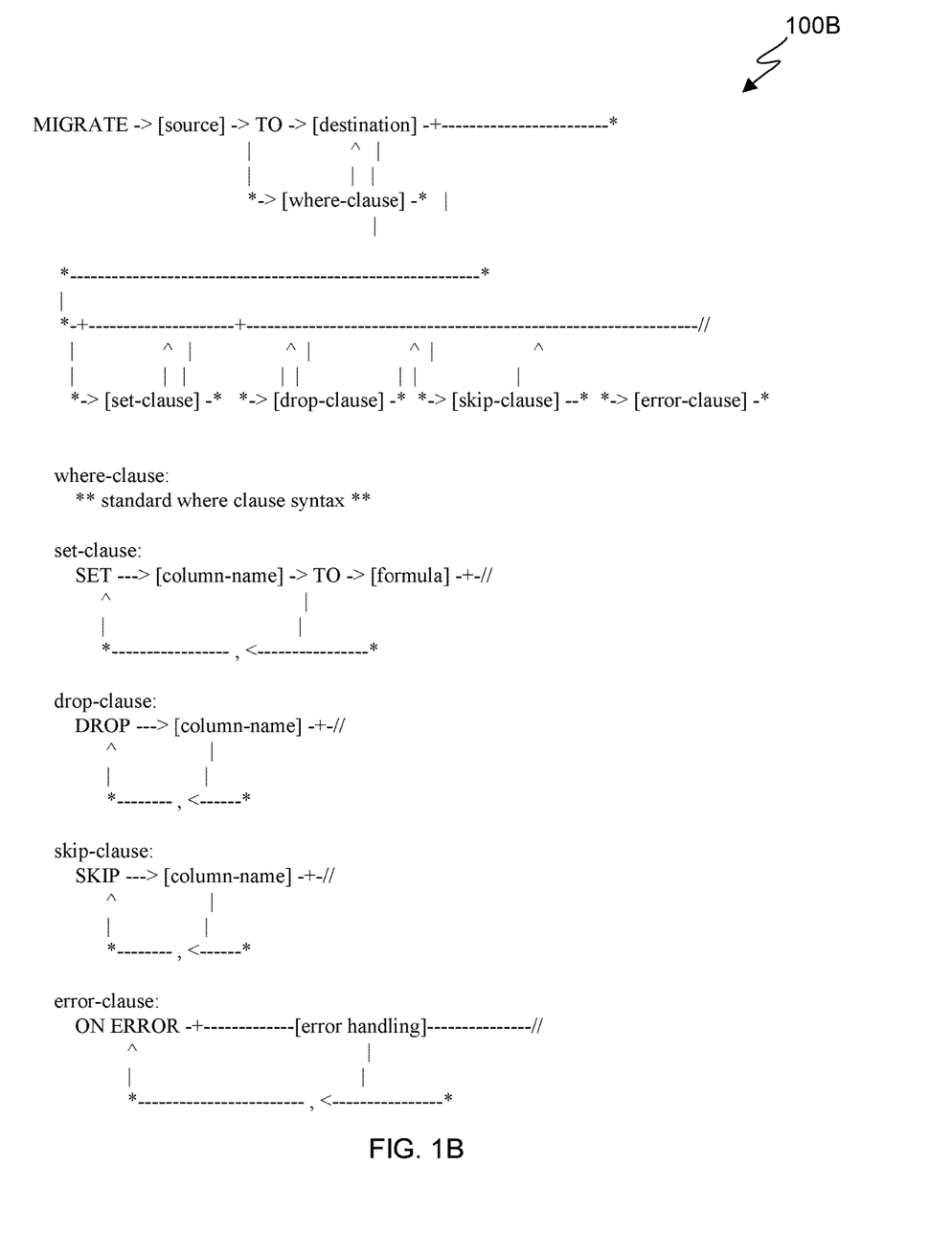

FIG. 1B illustrates MIGRATE statement syntax 100B, which is applied to various information handling systems. MIGRATE statement syntax 100B contains the following clauses: a "where-clause"; "set-clause"; "drop-clause"; "skip-clause"; and "error-clause".

Figure 2A:
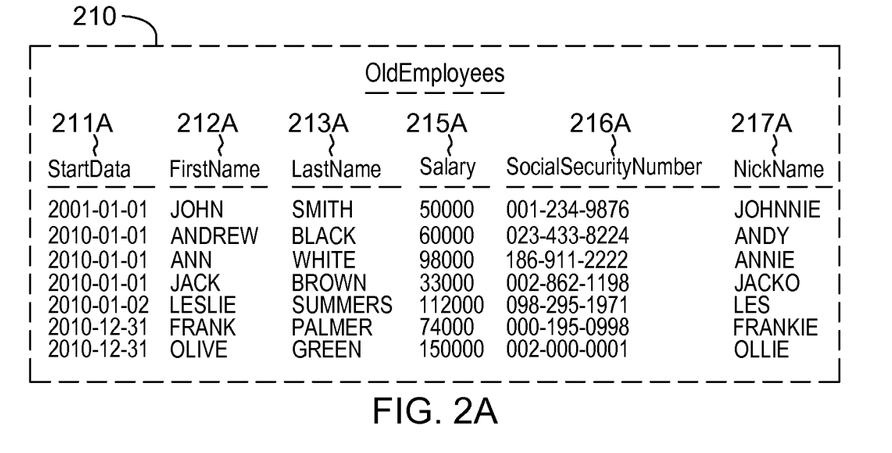
FIGS. 2A, 2B, and 2C depict an exemplary table utilizing a MIGRATE statement in SQL to migrate data from a source table to an existing table, in accordance with an embodiment of the present invention.
Figure 2B:
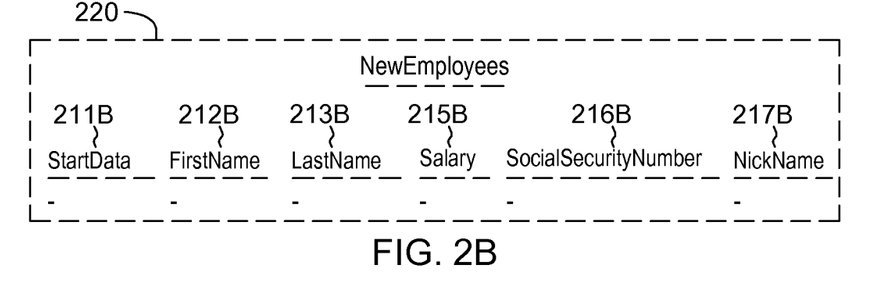
Figure 2C:
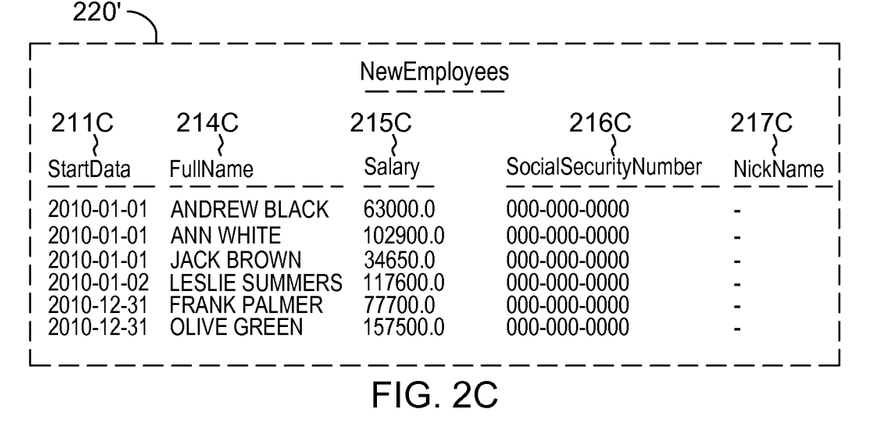

With reference to FIG. 2A, FIG. 2B, and FIG. 2C the following example portrays a simplified approach to copy data from one table to another, by transferring by default all columns in the source table to the same name columns in the destination table, while at the same time manipulating the destination table structure to the appropriate structure to facilitate the data transfer. Specifically, in the following example, a user may utilize an exemplary MIGRATE SQL statement to simultaneously manipulate data from the source table, copy the manipulated data from the source table to the destination table, and manipulate an existing destination table structure to accommodate the data transfer.

FIGS. 2A, 2B, and 2C depict three tables: OldEmployees table 210, NewEmployees table 220, and NewEmployees table 220', respectively. OldEmployees table 210, in FIG. 2A, is the source table which contains the information to be transferred. NewEmployees table 220, in FIG. 2B, is the existing destination table prior to the data transfer. NewEmployees table 220 is structurally identical to OldEmployees table 210, but lacks all information. NewEmployees table 220', in FIG. 2C, depicts NewEmployees table 220 after the execution of an exemplary MIGRATE statement.

In this example, DBMS 160 commences a data migration wherein data is copied from the source table, OldEmployees table 210, to an existing destination table, NewEmployees table 220, while at the same time manipulating both the data and the destination table structure during the transfer. NewEmployees table 220 exists before the data transfer, but it requires structural changes to enable the data transfer. OldEmployees table 210 has column headers of: StartDate 211A, FirstName 212A, LastName 213A, Salary 215A, SocialSecurityNumber 216A, and NickName 217A, and associated rows of data, comprised of these columns. Similarly, the existing NewEmployees table 220 has column headers of StartDate 211B, FirstName 212B, LastName 213B, Salary 215B, SocialSecurityNumber 216B, and NickName 217B, but lacks all associated data.

In this example, the DBMS 160 migrates the records associated with the columns with the following changes: (a) concatenate the employees' first and last names (from the source table, FirstName 212A and LastName 213A, respectively) together with a space in between to become a new column called FullName 214C in the destination table, NewEmployees table 220'; (b) increase the contents of column Salary 215A by five percent; (c) hide the SocialSecurityNumber 216A by replacing the contents of this column with the string '000-00-0000'; and (d) exclude the content from column NickName 217A from the copy process. The following exemplary MIGRATE statement will accomplish the user's task:

```
MIGRATE OldEmployees to NewEmployees
WHERE  StartDate >= '2010-01-01'
SET    FullName(CHAR(60)) = FirstName | ' ' | LastName,
       Salary = Salary * 1.05,
       SocialSecurityNumber = '000-000-0000'
DROP   FirstName,
       LastName
SKIP   NickName;
```

In the ongoing example, the destination table exists, therefore, the exemplary MIGRATE statement identifies all similar columns between the source table, OldEmployees table 210, and the destination table, NewEmployees table 220. In an alternative example, if the destination table does not exist, the MIGRATE statement will implicitly create the destination table by copying only the structure (i.e., columns, rows, and column headings, but not the data) of the source table.

The WHERE clause, if present, specifies that only those rows from the source table that meet specified criteria should be copied to the destination table. The WHERE clause is not a mandatory clause of the SQL MIGRATE statement, but can be used to limit the number of rows copied as a result of the statement. In the example shown, only those employees with a StartDate 211A after Jan. 1, 2010 are being copied to the destination table.

The SET clause is identified by the SET keyword and followed by one or more SET clause predicates to manipulate data between source columns and destination columns during the data transfer. In the example shown, the SET clause predicates include "FullName=FirstName |' '| LastName" which concatenates the FirstName 212A and LastName 213A columns and creates a new column into an existing destination NewEmployees table 220' column named FullName 214C. In the example shown, the SET clause predicates also include "Salary=Salary*1.05" which increases the contents of Salary 215A by five percent before it copies the resulting values into column Salary 215C, as well as implicitly changing the data type of the destination column Salary 215C to floating point if necessary. Additionally, in the example shown, the SET clause predicates also include "SocialSecurityNumber='000-00-0000'" which changes the values of column SocialSecurityNumber 216C to the specified set of zeros, effectively hiding the social security numbers.

In this exemplary embodiment, the DROP clause is identified by the DROP keyword and followed by one or more DROP clause predicates to specify columns that are to be dropped (i.e., removed) from the destination table. Specifically, the columns specified in a DROP clause predicate are physically removed from the destination table. In the example, the FirstName 212A and LastName 213A columns are being explicitly dropped (removed) via the DROP clause.

In this exemplary embodiment, the SKIP clause is identified by the SKIP keyword and followed by one or more SKIP clause predicates to exclude the content of specific source table columns from the data transfer to the destination table. Specifically, the SKIP clause will result in the data not being copied from the source table to the destination table for the specified columns; however, the column will still be created in the destination table, if the column does not exist in the destination table already. In the example, the data from NickName 217A column of OldEmployees table 210 is excluded from the data transfer via the SKIP clause, however the column NickName 217C remains in NewEmployees table 220' after the data transfer. Alternatively, if the destination table does not exist, or if the specified SKIP column does not exist, then, utilizing the SKIP clause, source columns can be added to the destitution table without transferring the content of the columns from the source table to the destination table.

In summary, the above exemplary SQL MIGRATE statement will (a) identify all common columns between the OldEmployees table 210 and the NewEmployees table 220; (b) combine FirstName 212A and LastName 213B columns from the OldEmployees table 210 into a new column, FullName 214C, in NewEmployees table 220'; (c) increase contents of column Salary 215A by 5% before copying it to Salary 215C; (d) hide SocialSecurityNumber 216C contents by putting zeros in the column; (e) drop FirstName 212B and LastName 213B columns from the NewEmployees table 220'; (f) skip column NickName 217C data in the data transfer (i.e., do not copy content from OldEmployees table 210 to NewEmployees table 220') (g) copy all remaining common columns from OldEmployees table 210 to NewEmployees table 220', and in the process change Salary 215C from Integer data type to Float. After the execution of the exemplary SQL MIGRATE statement, FIG. 2C depicts structurally different columns of NewEmployees table 220'. Specifically, NewEmployees table 220' has columns of; StartDate 211C, FullName 214C, Salary 215C, SocialSecurityNumber 216C, and NickName 217C.

Expanding on the previous example of OldEmployees table 210 and NewEmployees table 220', the following depicts the internal processing of the exemplary MIGRATE SQL statement as described above.

Figure 3:
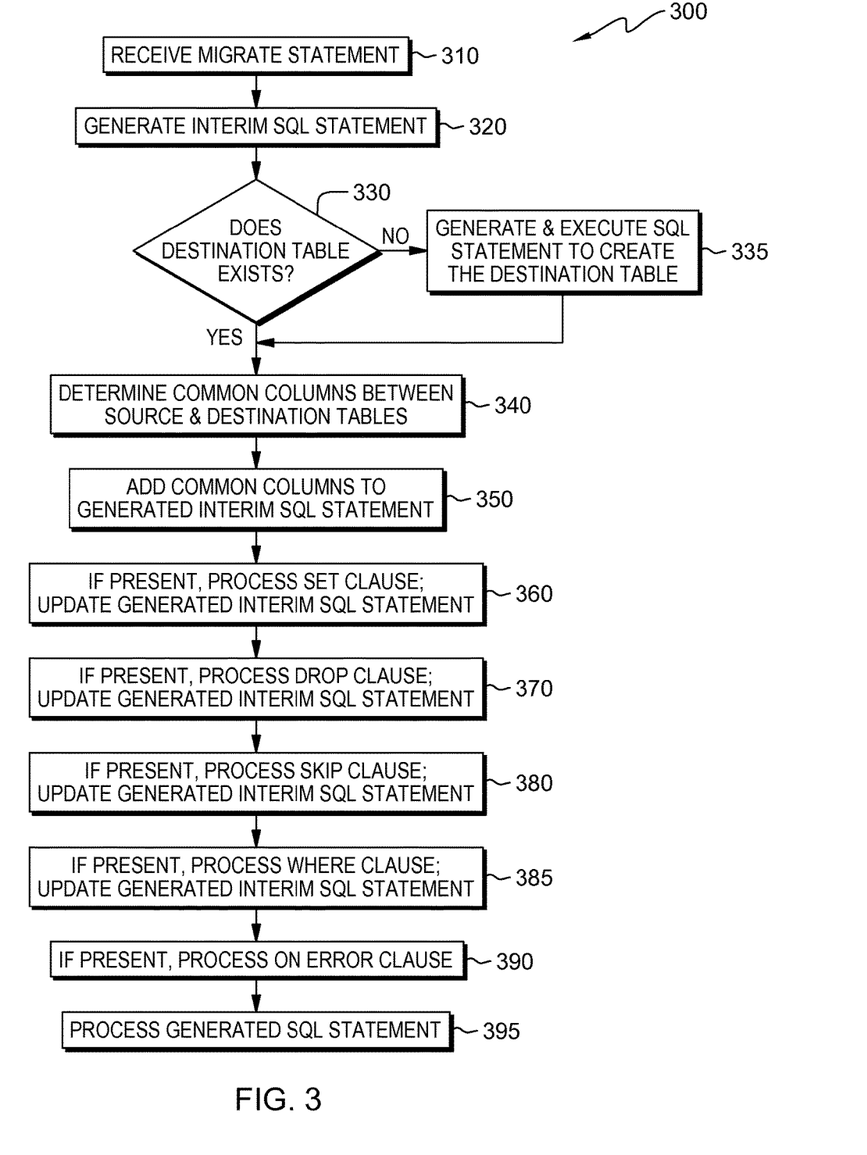
FIG. 3 illustrates the operational steps to copy data between tables with simultaneous destination table manipulation, in accordance with an embodiment of the present invention.

Reference is now made to FIG. 3, which gives further description of a mass data migration, which copies data from a source table to a destination table, as well as creates or manipulates the destination table to the structure required for the data transfer.

A SQL MIGRATE statement might originate from a data store where the MIGRATE instruction is stored or may be the result of an ad-hoc query performed by a user. Regardless of its origination, the overall processing of a SQL expression of a flexible statement, such as MIGRATE, may be processed through various methods. For example, the SQL MIGRATE statement may be processed by a (a) SQL pre-processor or (b) modified relational DBMS which has been modified to process the SQL MIGRATE statement without the use of an SQL pre-processor.

If the SQL MIGRATE statement is processed through a SQL pre-processor, then the SQL MIGRATE statement is read from a memory source and the database metadata is retrieved from an existing database management system. The database metadata includes attributes pertaining to database tables managed by the DBMS, including the source table used in the MIGRATE statement. For instance, these attributes may include column names pertaining to the source table. Additionally, the SQL pre-processor generates SQL statements from the SQL MIGRATE statement read from a data source, for example, SQL INSERT INTO, SQL SELECT. The generated SQL statements are "traditional" SQL statements wherein the statements can be processed by an existing relational DBMS. The generated SQL statements are stored to be used as an input to the DBMS. Finally, the system copies rows from the source table to the destination table using the traditional SQL statements. Note that the destination table may be an empty table or could be an existing database table that is manipulated to the required structure in order to receive data from the source table.

In another example, if the SQL statements are processed by modified relational DBMS, capable of processing the SQL MIGRATE statement without use of an SQL pre-processor, then the modified relational DBMS may read the statement from a memory area. Further, the modified relational DBMS may copy data from a source table to a destination table and simultaneously create or modify the existing destination table while processing the MIGRATE statement. Note that a destination table may be an empty table or could be an existing database table that is manipulated to the required structure in order to receive data from the source table.

FIG. 3 depicts flowchart 300 illustrating the operational steps to copy data between database tables with simultaneous destination table manipulation, in accordance with an embodiment of the present invention.

Flowchart 300 depicts an exemplary process of migrating data between two database tables via a step-by-step approach using a MIGRATE SQL statement. In step 310, the relational database management system 160 receives the MIGRATE statement. An exemplary MIGRATE statement is depicted below (note that the MIGRATE statement below is the same as the MIGRATE statement previously discussed), where the source table and the destination table are place holders to be replaced with the title of each respective table. Similarly, each of the MIGRATE statement clauses (i.e., Where, Set, Drop and Skip) are optional and displayed for exemplary purposes only.

```
MIGRATE [Source Table] to [Destination Table]
WHERE
SET
DROP
SKIP
```

Continuing the ongoing example, where the source table is OldEmployees table 210, and the destination table is NewEmployees table 220', the example MIGRATE statement in step 310 looks like:

```
MIGRATE OldEmployees table 210 to NewEmployees table 220'
WHERE StartDate >= '2010-01-01'
SET    FullName(CHAR(60)) = FirstName | ' ' | LastName,
       Salary = Salary * 1.05,
       SocialSecurityNumber = '000-000-0000'
DROP   FirstName,
       LastName
SKIP   NickName;
```

In step 320, DBMS 160 generates the interim SQL statement that will be used to copy data from the source table to the destination table from the MIGRATE statement. The generated interim SQL statement contains the instructions to copy data from the source table to the destination table. In step 320, the DBMS reads the MIGRATE statement and retrieves various pieces of information for the source and destination tables, including the column names, and retains it for later use. Generally, the generated interim SQL statement may contain various clauses, an INSERT INTO clause, a SELECT clause, and a FROM clause. The INSERT INTO clause lists the columns of the destination table. For example, in step 320 the DBMS generates an INSERT INTO clause followed by the name of the destination table (e.g., "INSERT INTO Destination Table name"). The SELECT clause selects specific columns from the source table to be copied into the destination table. For example, in step 320 the DBMS generates a SELECT clause followed by the name of the Source table (e.g., "INSERT INTO Source Table name"). Specifically, any data generated by the SELECT clause is added into the table defined by the INSERT INTO clause. Finally, the DBMS generates a FROM clause followed by the name of the source table (e.g., "FROM Source Table name").

In step 330, the DBMS 160 determines whether a destination table exists for the data migration. In step 335, if the destination table does not exist, then a destination table is created via an exact copy of the source table. Specifically, step 335 generates and executes an SQL statement to create the destination table.

If the DBMS 160 determines that the destination table does exist, then, in step 340, the DBMS determines the common columns between the source and destination tables. The DBMS 160 retrieves the various information, such as the column names, from both the source table and the destination table, and then determines common column names between the source table and the destination for implicit data transfer. Referring back to the ongoing example, since OldEmployees table 210 of FIG. 2A and NewEmployees table 220 of FIG. 2B are identical in structure the common columns are identical between the source and destination tables.

In step 350, the DBMS 160 adds common columns to the generated interim SQL statement (as initially generated in step 320) to copy data from the source table and the destination table. In updating the interim SQL statement the DBMS 160 retrieves the column names of the destination table and copies the column names following the INSERT INTO clause. Next, the DBMS retrieves the column names from the source table, and copies the column names referenced both in the source and destination columns following the SELECT clause. Continuing the ongoing example and tables of FIG. 2A and FIG. 2B, the generated interim SQL statement is as follows:

```
INSERT INTO NewEmployees table 220
 (StartDate 211B
 ,FirstName 212B
 ,LastName 213B
 ,Salary 215B
 ,SocialSecurityNumber 216B
 ,NickName 217B)
SELECT
 StartDate 211A
 ,FirstName 212A
 ,LastName 213A
 ,Salary 215A
 ,SocialSecurityNumber 216A
 ,NickName 217A
FROM OldEmployees table 210
```

In steps 360 through 390, the DBMS processes the MIGRATE statement then at step 395 the DBMS copies the data from the source table to the destination table. In steps 360 through 390 the MIGRATE statement is parsed into its component parts based on the syntax of the statement. The components of the MIGRATE statement include the source table name and the destination table name. Note that the destination table may be newly created or an existing table which receives additional data from the source table. Also, the MIGRATE statement includes several optional clauses, such as an optional SET clause, an optional DROP clause, an optional SKIP clause and an optional WHERE clause. The optional clauses of steps 360 through 390 are not mandatory but can be used to limit and manipulate the number of rows copied as a result of the statement. Flowchart 300 depicts all optional clauses for exemplary purposes only. Any optional clauses may be omitted.

In step 360 DBMS processes the SET clause within a MIGRATE statement and updates the generated interim SQL statement, accordingly. Generally, a SET clause is used to manipulate data between source column and the destination column during the data transfer. Additionally, a SET clause indicates the column to which data should be published from left to right. The column number specified in the INSERT INTO clause must correspond to the same number specified in the SELECT clause. Since the SET clause is optional, an implicit decision is made as to whether a SET clause is present in the MIGRATE statement. If a SET clause is not present in the MIGRATE statement, then the DBMS proceeds to step 370. Rather, if a SET clause is present in the MIGRATE statement, then the DBMS will process the SET clause. In Step 360, the DBMS will process any SET clause(s) found in a MIGRATE statement, and update the generated interim SQL statement accordingly.

A SET clause is identified by the 'SET' keyword and followed by one or more SET clause predicates. In one embodiment, each SET clause predicate is by commas. A SET clause predicate is made up of two components, a name element and an expression element, separated by an equal sign ('='). The name element is before the equal sign ('=') and the expression element is after the equal sign ('='). The name element, as identified in the SET clause predicate, is compared to the source column names that follow the SELECT clause. If the name element is an existing column name (i.e., it matches an existing source column name that followed the SELECT clause) then that specific column name is replaced with the identified expression element, thereby updating the generated interim SQL statement. Alternatively, if the name element is not an existing column name (i.e., it does not match an existing source column name that followed the SELECT clause) then the name element is added to the INSERT INTO clause and the expression is added to the SELECT clause with the expression element, thereby updating the generated interim SQL statement. After the first SET clause predicate has been processed and the generated interim SQL statement updated accordingly, the DBMS repeats the above until there are no remaining SET clause predicates to be processed.

Utilizing the ongoing example, there are three SET clause predicates. As previously discussed, the first SET clause predicate adds column FullName 214C to NewEmployees table 220', wherein FullName 214C combines FirstName 212A and LastName 213A of OldEmployees table 210. Here, the name element "FullName" is not an existing column name in the destination table (i.e., it does not match an existing source column name that followed the SELECT clause). To add the column "FullName" to the destination table, an interim SQL statement must be generated and executed. In generating the interim SQL statement the name element "FullName" is added to the INSERT INTO clause and the expression element "FirstName |' '| LastName" is added to the SELECT clause of the generated interim SQL statement. Further, the placement of the name element ("FullName") added to the INSERT INTO clause matches the placement of the expression element ("FirstName |' '| LastName") added to the SELECT clause. Upon executing the SQL statement, "FullName" 214C is added to the destination table. In the modified exemplary generated interim SQL statement shown below, both are added to the second placement of each respective clause.

As previously discussed, the second SET clause predicate increases Salary 215A by five percent and the third SET clause predicates hides the SocialSecurityNumber 216A. When the name element is an existing source column name, then the matching source column name within the SELECT clause is replaced with the identified expression element. Here both name elements are existing column name (i.e., it matches an existing source column name that followed the SELECT clause). Therefore the identified expression elements replace the existing SELECT clause elements. Specifically, the source column name element "Salary" has been replaced with the expression element "Salary*1.05" and the source column name element "SocialSecurityNumber" has been replaced with the expression element '000-00-0000' per the SET clause predicates found in the MIGRATE statement. In the modified exemplary generated interim SQL statement shown below, both expression elements are added to the fifth and sixth placement of the SELECT clause.

After processing the SET clause, the modified exemplary generated interim SQL statement is now as follows:

```
INSERT INTO NewEmployees table 220
  (StartDate
  ,FullName
  ,FirstName
  ,LastName
  ,Salary
  ,SocialSecurityNumber
  ,NickName)
SELECT
  StartDate
  ,(FirstName, | ' ' |, LastName)
  ,FirstName
  ,LastName
  ,Salary*1.05
  ,'000-00-000'
  ,NickName
FROM OldEmployees table 210
```

In step 370, DBMS processes the DROP clause within a MIGRATE statement and updates generated interim SQL statement accordingly. Generally, a DROP clause is used to manipulate the structure of the destination table during the data transfer. Since the DROP clause is optional, an implicit decision is made as to whether a DROP clause is present in the MIGRATE statement. If a DROP clause is not present in the MIGRATE statement, then the DBMS proceeds to step 380. Rather, if a DROP clause is present in the MIGRATE statement, then the DBMS will process the DROP clause. In step 370, the DBMS will process any DROP clause(s) found in a MIGRATE statement, and update the generated interim SQL statement accordingly.

A DROP clause is identified by the 'DROP' keyword and followed by one or more DROP clause predicates. The DROP clause identifies specific columns which are removed from the destination table. In one embodiment, each DROP clause predicate is delimited by commas. The DROP clause predicate indicates a specific column not to be copied and removed from the destination table in its entirety. Specifically, DBMS 160 removes the selected column name from the destination table column list following the INSERT INTO clause. Additionally, DBMS removes the selected column name from the source table column list following the SELECT clause. After the first DROP clause predicate has been processed and the generated interim SQL statement updated accordingly, the DBMS repeats the above until there are no remaining DROP clause predicates to be processed.

Utilizing the ongoing example, there are two DROP clause predicts. As previously discussed, the SQL statements drop the columns titled FirstName and LastName. The process removes source and destination columns from the generated interim SQL statement, where the DROP statement explicitly specifies those columns that are to be removed from the destination table, thereby excluding those columns from the data transfer (e.g., FirstName 212B and LastName 213B). Continuing the example above, (reference to FIG. 2B and FIG. 2C tables NewEmployees table 220 and NewEmployees table 220', respectively), the modified exemplary generated interim SQL statement is now as follows:

```
INSERT INTO NewEmployees table 220
  (StartDate
  ,FullName
  ,Salary
  ,SocialSecurityNumber
  ,NickName)
SELECT
  StartDate
  ,(FirstName, | ' ' |, LastName)
  ,Salary*1.05
  ,'000-00-000'
  ,NickName
FROM OldEmployees table 210
```

In step 380, DBMS 160 processes the SKIP clause within a MIGRATE statement and updates generated interim SQL statement accordingly. Generally, a SKIP clause is used to manipulate data between source column and the destination column during the data transfer. Since the SKIP clause is optional, an implicit decision is made as to whether a SKIP clause is present in the MIGRATE statement. If a SKIP clause is not present in the MIGRATE statement, then the DBMS 160 proceeds to step 385. Rather, if a SKIP clause is present in the MIGRATE statement, then the DBMS will process the SKIP clause. In step 380, the DBMS will process any SKIP clause(s) found in a MIGRATE statement, and update the generated interim SQL statement accordingly.

A SKIP clause is identified by the 'SKIP' keyword and followed by one or more SKIP clause predicates. In one embodiment, each SKIP clause predicate is delimited by commas. The SKIP clause predicate indicates a specific column data not to be copied from the source table to the destination table. Specifically, DBMS leaves the specified column name in the destination table, but removes the specified column name from the INSERT INTO clause. Additionally, DBMS removes the selected column name from the SELECT clause. For example, if the column referenced in the SKIP clause does not exist in the destination table, the column is added to the destination table but the reference to such column is removed from the interim generated SQL statement. In another embodiment the column may not be added to the destination table. After the first SKIP clause predicate has been processed and the generated interim SQL statement updated accordingly, the DBMS repeats the above until there are no remaining SKIP clause predicates to be processed.

Utilizing the ongoing example, there is one SKIP clause predicate present. As previously discussed, the SQL statement will result in the data contained in NickName Column, not being copied from the source table to the destination table. The process removes source and destination columns from the generated interim SQL statement, where the SKIP statement explicitly specifies those columns that are to be skipped during the migration, thereby excluding those columns from the data transfer (e.g., NickName 217A). Continuing the example above, (reference to FIG. 2A OldEmployees table 210 and FIG. 2B NewEmployees table 220), the modified example generated SQL statement is now as follows:

```
INSERT INTO NewEmployees table 220
   (StartDate
   ,FullName
   ,Salary
   ,SocialSecurityNumber
SELECT
   StartDate
   ,(FirstName, | ' ' |, LastName)
   ,Salary*1.05
   ,'000-00-000'
FROM OldEmployees table 210
```

In step 385, DBMS 160 processes the WHERE clause within a MIGRATE statement and updates generated interim SQL statement accordingly. Generally, a WHERE clause is used to and/or include specific rows during the data transfer. Since the WHERE clause is optional, an implicit decision is made as to whether a WHERE clause is present in the MIGRATE statement. If a WHERE clause is not present in the MIGRATE statement, then the DBMS proceeds to step 390. Rather, if a WHERE clause is present in the MIGRATE statement, then the DBMS will process the WHERE clause. In step 385, the DBMS will process any WHERE clause(s) found in a MIGRATE statement, and update the generated interim SQL statement accordingly.

A WHERE clause is identified by the 'WHERE' keyword and followed by one or more WHERE clause predicates. A WHERE clause is used to limit the number of rows copied. Specifically, the WHERE clause, if present, specifies that only rows from the source table that meet specified criteria should be copied to the destination table. In the example shown, only those rows with a StartDate>='2010-01-01' are being copied to the destination table. Continuing the example above, (reference to FIG. 2A OldEmployees table 210 and FIG. 2B NewEmployees table 220), the modified exemplary generated SQL statement is now as follows:

```
INSERT INTO NewEmployees table 220
   (StartDate
   ,FullName
   ,Salary
   ,SocialSecurityNumber
SELECT
   StartDate
   ,(FirstName, | ' ' |, LastName)
   ,Salary*1.05
   ,'000-00-000'
FROM OldEmployees table 210
WHERE StartDate >= '2010-01-01'
```

In step 390 DBMS processes the ON ERROR clause within a MIGRATE statement and updates generated interim SQL statement accordingly. Generally, an ON ERROR clause is used to make adjustments as needed based on any mismatches found between the source and destination table of the generated interim SQL statement. Since the ON ERROR clause is optional, an implicit decision is made as to whether an ON ERROR clause is present in the MIGRATE statement. If an ON ERROR clause is not present in the MIGRATE statement, then the DBMS proceeds to step 390. Rather, if an ON ERROR clause is present in the MIGRATE statement, then the DBMS will process the ON ERROR clause. In step 385, the DBMS will process any ON ERROR clause(s) found in a MIGRATE statement, and update the generated interim SQL statement accordingly.

Finally, at step 395, the DBMS 160 executes the generated interim SQL statement which results in data being copied from source table to destination table based on the parameters included in the original MIGRATE statement. Continuing the example above, once the exemplary SQL statement is executed, the data is migrated from the source table, OldEmployees table 210 to the destination table, NewEmployees table 220'.

Figure 4:
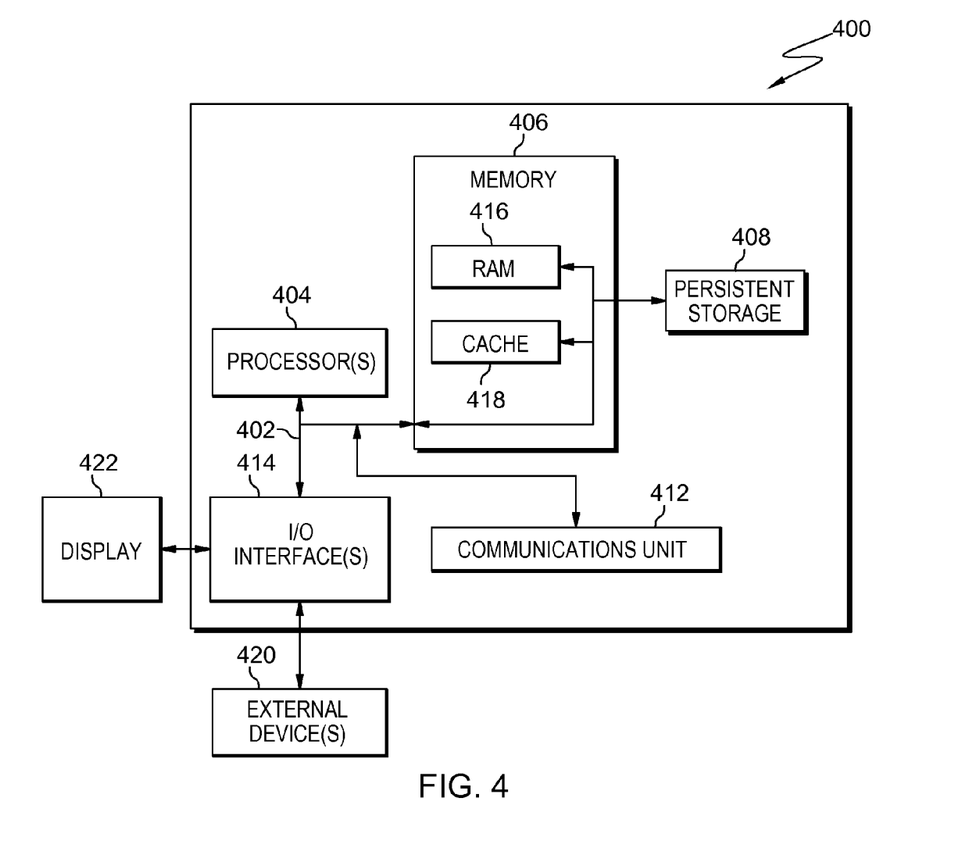
FIG. 4 depicts a block diagram of internal and external components of a device, in accordance with an embodiment of the present invention.

FIG. 4 depicts a block diagram of internal and external components of device 400, in accordance with an embodiment of the present invention. It should be appreciated that FIG. 4 provides only an illustration of one implementation, and does not imply any limitations with regard to the environments in which different embodiments may be implemented. Many modifications to the depicted environment may be made.

Device 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Persistent storage 408 may include, for example, a plurality of magnetic hard disk drives. Programs are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Software and data used to practice embodiments of the present invention can be downloaded through communications unit 412 (i.e., via the Internet, a local area network, or other wide area network). From communications unit 412, the software and data may be loaded to persistent storage 408.

I/O interface(s) 414 allows for input and output of data with other devices that may be connected to information handling systems. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for migrating data between tables, the method comprising:
   receiving, by one or more processors, a Structured Query Language (SQL) statement, wherein the SQL statement identifies a source table and a destination table, and wherein the source table comprises a plurality of source data divided into columns with a set of source column names;
   identifying at least one set of instructions associated with the SQL statement, wherein the at least one set of instructions further comprise: instructions for manipulating the plurality of source data;
   generating an interim SQL statement, based on the SQL statement;
   responsive to identifying the least one set of instructions associated with the SQL statement, manipulating the plurality of source data and the destination table by executing a plurality of clauses, wherein the plurality of clauses contain functional syntax comprising at least one of: migrating contents of the plurality of source data;
   executing the interim SQL statement, wherein executing the interim SQL statement comprises: copying the manipulated plurality of source data into a set of destination columns of the destination table; and
   migrating the contents of the plurality of source data to the set of destination columns of the destination table, wherein the migrated contents derive from the plurality of clauses.

2. The method of claim 1, wherein manipulating the destination table comprises:
   determining whether the destination table has a structure and a set of destination column names; and
   in response to determining the destination table does not have a structure and the set of destination column names, copying a structure of the source table and the set of source column names into the destination table.

3. The method of claim 2, further comprising:
   in response to determining the destination table has a structure and the set of destination column names, modifying the structure of the destination table and the destination column names, wherein modifying the structure of the destination table further comprises at least one of:
   adding at least one column to the destination table; and
   removing at least one column from the destination table.

4. The method of claim 1, wherein generating the interim SQL statement comprises:
   utilizing the plurality of clauses, wherein the plurality of clauses comprises: a SELECT clause and an INSERT INTO clause;
   updating, based on the at least one set of instructions associated with the SQL statement, the SELECT clause and the INSERT INTO clause, wherein, the SELECT clause comprises instructions for selecting at least one column name from the set of source column names to be copied into the destination table and wherein the INSERT INTO clause comprises instructions for inserting the manipulated plurality of source data into the set of destination columns of the destination table.

5. The method of claim 1, wherein the at least one set of instructions associated with the SQL statement, further comprises:
   identifying a first clause among the plurality of clauses, wherein the first clause comprises a name element and an expression element,
   determining whether the name element is substantially similar to at least one column name of the set of source column names,
   in response to determining that the name element is substantially similar to at least one column name of the set of source column names, replacing the at least one column name of the set of source column names with the expression element of the first clause; and
   in response to determining that the name element is not substantially similar to at least one column name of the set of source column names:
     adding the name element, of the first clause, to a set of destination column names;
     adding a column to the set of destination columns; and
     adding the expression element, of the first clause, to the set of source column names.

6. The method of claim 1, wherein the at least one set of instructions associated with the SQL statement, further comprises:
   identifying a second clause among the plurality of clauses, wherein the second clause comprises a name element;
   determining whether the name element is substantially similar to at least one column name of the set of source column names;
   in response to determining that the name element is substantially similar to the at least one column name of the set of source column names, removing a column, associated with the substantially similar column name of the set of source column names, from the destination table.

7. The method of claim 1, wherein the at least one set of instructions associated with the SQL statement, further comprises:
   identifying a third clause among the plurality of clauses, wherein the third clause comprises a name element;
   determining whether the name element is substantially similar to at least one column name of the set of source column names; and in response to determining that the name element is substantially similar to at least one column name of the set of source column names:
maintaining a column in the destination table, wherein the column in the destination table is associated with the substantially similar column name of the set of source column names, and
removing the plurality of source data corresponding to the substantially similar column name of the set of source column names, from the source table.

8. A computer program product comprising:
a computer readable storage medium and program instructions stored on the computer readable storage medium, the program instructions comprising:
program instructions to receive, by one or more processors, a Structured Query Language (SQL) statement, wherein the SQL statement identifies a source table and a destination table, and wherein the source table comprises a plurality of source data divided into columns with a set of source column names;
program instructions to identify at least one set of instructions associated with the SQL statement, wherein the at least one set of instructions further comprise: instructions for manipulating the plurality of source data;
program instructions to generate an interim SQL statement, based on the SQL statement;
responsive to identifying the least one set of instructions associated with the SQL statement, program instructions to manipulate the plurality of source data and the destination table by executing a plurality of clauses, wherein the plurality of clauses contain functional syntax comprising at least one of: program instructions to migrate contents of the plurality of source data;
program instructions to execute the interim SQL statement, wherein the program instructions to execute the interim SQL statement comprise: program instructions to copy the manipulated plurality of source data into a set of destination columns of the destination table; and
program instructions to migrate the contents of the plurality of source data to the set of destination columns of the destination table, wherein the migrated contents derive from the plurality of clauses.

9. The computer program product of claim 8, program instructions to manipulate the destination table comprise:
program instructions to determine whether the destination table has a structure and a set of destination column names; and
in response to determining the destination table does not have a structure and a set of destination column names, program instructions to copy a structure of the source table and the set of source column names into the destination table.

10. The computer program product of claim 9, further comprising:
in response to determining the destination table has a structure and a set of destination column names, program instructions to modify the structure of the destination table and the destination column names, wherein the program instructions to modify the structure of the destination table further comprise at least one of:
program instructions to add at least one column to the destination table; and
program instructions to remove at least one column from the destination table.

11. The computer program product of claim 8, wherein the program instructions to generate the interim SQL statement comprise:
program instructions to utilize the plurality of clauses, wherein the plurality of clauses comprises: a SELECT clause and an INSERT INTO clause;
program instructions to update, based on the at least one set of instructions associated with the SQL statement, the SELECT clause and the INSERT INTO clause, wherein, the SELECT clause comprises instructions for selecting at least one column name from the set of source column names to be copied into the destination table and wherein the INSERT INTO clause comprises instructions for inserting the manipulated plurality of source data into the set of destination columns of the destination table.

12. The computer program product of claim 8, wherein the at least one set of instructions associated with the SQL statement, further comprise:
program instructions to identify a first clause among the plurality of clauses, wherein the first clause comprises a name element and an expression element,
program instructions to determine whether the name element is substantially similar to at least one column name of the set of source column names,
in response to determining that the name element is substantially similar to at least one column name of the set of source column names, program instructions to replace the at least one column name of the set of source column names with the expression element of the first clause; and
in response to determining that the name element is not substantially similar to at least one column name of the set of source column names:
program instructions to add the name element, of the first clause, to a set of destination column names;
program instructions to add a column to the set of destination columns; and
program instructions to add the expression element, of the first clause, to the set of source column names.

13. The computer program product of claim 8, wherein the at least one set of instructions associated with the SQL statement, further comprise:
program instructions to identify a second clause among the plurality of clauses, wherein the second clause comprises a name element;
program instructions to determine whether the name element is substantially similar to at least one column name of the set of source column names; and
in response to determining that the name element is substantially similar to the at least one column name of the set of source column names, program instructions to remove a column, associated with the substantially similar column name of the set of source column names, from the destination table.

14. The computer program product of claim 8, wherein the at least one set of instructions associated with the SQL statement, further comprises:
program instructions to identify a third clause among the plurality of clauses, wherein the third clause comprises a name element;
program instructions to determine whether the name element is substantially similar to at least one column name of the set of source column names; and
in response to determining that the name element is substantially similar to at least one column name of the set of source column names:
program instructions to maintain a column in the destination table, wherein the column in the destination table is associated with the substantially similar column name of the set of source column names, and
program instructions to remove the plurality of source data corresponding to the substantially similar column name of the set of source column names, from the source table.

15. A computer system comprising:
one or more computer processors;
one or more computer readable storage media;
program instructions stored on the one or more computer readable storage media for execution by at least one of the one or more processors, the program instructions comprising:
program instructions to receive, by one or more processors, a Structured Query Language (SQL) statement, wherein the SQL statement identifies a source table and a destination table, and wherein the source table comprises a plurality of source data divided into columns with a set of source column names;
program instructions to identify at least one set of instructions associated with the SQL statement, wherein the at least one set of instructions further comprise: instructions for manipulating the plurality of source data;
program instructions to generate an interim SQL statement, based on the SQL statement;
responsive to identifying the least one set of instructions associated with the SQL statement, program instructions to manipulate the plurality of source data and the destination table by executing a plurality of clauses, wherein the plurality of clauses contain functional syntax comprising at least one of: program instructions to migrate contents of the plurality of source data;
program instructions to execute the interim SQL statement, wherein the program instructions to execute the interim SQL statement comprise: program instructions to copy the manipulated plurality of source data into a set of destination columns of the destination table; and
program instructions to migrate the contents of the plurality of source data to the set of destination columns of the destination table, wherein the migrated contents derive from the plurality of clauses.

16. The computer system of claim 15, program instructions to manipulate the destination table comprise:
program instructions to determine whether the destination table has a structure and a set of destination column names; and
in response to determining the destination table does not have a structure and a set of destination column names, program instructions to copy a structure of the source table and the set of source column names into the destination table.

17. The computer system of claim 16, further comprising:
in response to determining the destination table has a structure and a set of destination column names, program instructions to modify the structure of the destination table and the destination column names, wherein the program instructions to modify the structure of the destination table further comprise at least one of:
program instructions to add at least one column to the destination table; and
program instructions to remove at least one column from the destination table.

18. The computer system of claim 15, wherein the program instructions to generate the interim SQL statement comprise:
program instructions to utilize the plurality of clauses, wherein the plurality of clauses comprises: a SELECT clause and an INSERT INTO clause;
program instructions to update, based on the at least one set of instructions associated with the SQL statement, the SELECT clause and the INSERT INTO clause, wherein, the SELECT clause comprises instructions for selecting at least one column name from the set of source column names to be copied into the destination table and wherein the INSERT INTO clause comprises instructions for inserting the manipulated plurality of source data into the set of destination columns of the destination table.

19. The computer system of claim 15, wherein the at least one set of instructions associated with the SQL statement, further comprise:
program instructions to identify a first clause among the plurality of clauses, wherein the first clause comprises a name element and an expression element,
program instructions to determine whether the name element is substantially similar to at least one column name of the set of source column names,
in response to determining that the name element is substantially similar to at least one column name of the set of source column names, program instructions to replace the at least one column name of the set of source column names with the expression element of the first clause; and
in response to determining that the name element is not substantially similar to at least one column name of the set of source column names:
program instructions to add the name element, of the first clause, to a set of destination column names;
program instructions to add a column to the set of destination columns; and
program instructions to add the expression element, of the first clause, to the set of source column names.

20. The computer system of claim 15, wherein the at least one set of instructions associated with the SQL statement, further comprise:
program instructions to identify a second clause among the plurality of clauses, wherein the second clause comprises a name element;
program instructions to determine whether the name element is substantially similar to at least one column name of the set of source column names; and
in response to determining that the name element is substantially similar to the at least one column name of the set of source column names, program instructions to remove a column, associated with the substantially similar column name of the set of source column names, from the destination table.

* * * * *